(12) United States Patent
Dobbins et al.

(10) Patent No.: US 8,615,383 B2
(45) Date of Patent: Dec. 24, 2013

(54) IMMERSIVE COLLABORATIVE ENVIRONMENT USING MOTION CAPTURE, HEAD MOUNTED DISPLAY, AND CAVE

(75) Inventors: Michael K. Dobbins, Forth Worth, TX (US); Pascale Rondot, Keller, TX (US); Eric D. Shone, Arlington, TX (US); Michael R. Yokell, Fort Worth, TX (US); Kevin J. Abshire, Benbrook, TX (US); Anthony Ray Harbor, Sr., Azle, TX (US); Scott Lovell, Danielson, CT (US); Michael K. Barron, Willow Park, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1058 days.

(21) Appl. No.: 12/355,771

(22) Filed: Jan. 17, 2009

(65) Prior Publication Data

US 2009/0187389 A1 Jul. 23, 2009

Related U.S. Application Data

(60) Provisional application No. 61/022,185, filed on Jan. 18, 2008.

(51) Int. Cl.
*G06F 17/50* (2006.01)
*G09G 5/00* (2006.01)

(52) U.S. Cl.
USPC .............................................. 703/1; 345/156

(58) Field of Classification Search
USPC .............................................. 703/1; 345/156
See application file for complete search history.

(56) References Cited

U.S. PATENT DOCUMENTS

| | | | | |
|---|---|---|---|---|
| 6,570,555 | B1* | 5/2003 | Prevost et al. | 345/156 |
| 2002/0095613 | A1* | 7/2002 | Matsuoka et al. | 713/400 |
| 2002/0123812 | A1 | 9/2002 | Jayaram et al. | |
| 2004/0075677 | A1* | 4/2004 | Loyall et al. | 345/706 |
| 2005/0131924 | A1* | 6/2005 | Jones | 707/100 |
| 2008/0146302 | A1* | 6/2008 | Olsen et al. | 463/7 |
| 2009/0187389 | A1* | 7/2009 | Dobbins et al. | 703/6 |

FOREIGN PATENT DOCUMENTS

RU 2273038 3/2006

OTHER PUBLICATIONS

Janne Jalkanen, Building a Spatially Immersive Display, HUTCAVE, Mar. 4, 2000.
Jason Leigh et al, A Tele-Imersive Environment for Collaborative Exploratory Analysis of Massive Data Sets, ASC Jun. 1999.

(Continued)

*Primary Examiner* — David Silver
(74) *Attorney, Agent, or Firm* — Bracewell & Giuliani LLP

(57) ABSTRACT

A collaborative visualization system integrates motion capture and virtual reality, along with kinematics and computer-aided design (CAD), for the purpose, for example, of evaluating an engineering design. A virtual reality simulator creates a full-scale, three-dimensional virtual reality simulation responsive to computer-aided design (CAD) data. Motion capture data is obtained from users simultaneously interacting with the virtual reality simulation. The virtual reality simulator animates in real time avatars responsive to motion capture data from the users. The virtual reality simulation, including the interactions of the one or more avatars and also objects, is displayed as a three-dimensional image in a common immersive environment using one or more head mounted displays so that the users can evaluate the CAD design to thereby verify that tasks associated with a product built according to the CAD design can be performed by a predetermined range of user sizes.

14 Claims, 8 Drawing Sheets

(56) References Cited

OTHER PUBLICATIONS

Physor.com, Utd establishes motion capture and virtual reality laboratory, Jan. 18, 2005.

PCT/US2009/03142 Search Report mailed on Feb. 2, 2010.

Jack Thorton, "At Lockheed Martin's SAIL, DELMIA Links VR to Immersive Engineering for the F-35 Lightning II", CATIA Community, Oct. 4, 2007, 11 pages, MINDFEED Marcomm, Santa Fe, N.M., USA (downloaded from http://www.catiacommunity.com/feature_full_guest.php?cpfeatureid=23325 on Jan. 4, 2008).

Aili McConnon, "The Mind-Bending New World of Work: Motion-capture technology has burst out of Hollywood and into business from aerospace to advertising", BusinessWeek, Apr. 2, 2007, 5 pages, the McGraw-Hill Companies (downloaded from http://www.businessweek.com/print/magazine/content/07_14/b4028001.htm?chan=gl on Jan. 4, 2008).

Dassault Systemes (press release), "Lockheed Martin Savings with Dassault Systemes' DELMIA Give Taxpayers One 'Free' F-35 Lightning II", Sep. 13, 2007, 2 pages (downloaded from http://www.3ds/news-events/press-releases/release/1601/1/ on Jan. 4, 2008).

Byron Harris, "Fighter planes improved using imaginary aircraft", Apr. 18, 2007, 2 pages, WFAA-TV (downloaded from http://www.wfaa.com/ on Jan. 4, 2008).

\* cited by examiner

IMMERSIVE COLLABORATIVE ENVIRONMENT USING MOTION CAPTURE, HEAD MOUNTED DISPLAY, AND CAVE

RELATED APPLICATIONS

This application claims priority to and the benefit of U.S. Provisional Patent Application Ser. No. 61/022,185, by Dobbins et al., titled "System and Program Product for Providing a Collaborative Immersive Environment and Related Methods" filed Jan. 18, 2008, incorporated herein by reference in its entirety.

BACKGROUND

1. Field of Invention

The present invention relates generally to virtual reality and motion capture, and, more particularly, to systems and program products which allow persons to interact with real and artificial environments using motion capture.

2. Background

Various techniques and technologies exist which allow users to interact with or analyze their environment. For example, motion capture techniques are used in the fields of sports, medicine, and entertainment, especially video gaming and animation. In sports, for example, motion capture enables a golfer's swing to be digitally recorded for analysis. In medicine, orthopedic rehabilitation can employ motion capture to provide feedback to the patient, illustrating correct or incorrect techniques with the patient's movements during walking, for example. In animation, motion capture allows for an actor's movements and even facial expressions to be digitally recorded in a computer model. Later, animators use the actor's recorded motions as the basis for the motions of a computer-generated character. Likewise, video games use motion capture to facilitate the animation of life-like characters within the games.

Virtual reality technologies allow a user to interact with a computer-simulated environment. Most virtual reality environments rely on computer screens or stereoscopic displays and are primarily visual experiences. A popular example of virtual reality technology is a flight simulator video game, in which the player pilots a virtual aircraft in a computer-simulated environment.

Telepresence refers to technologies which allow the user to experience, or be present at, a remote location. For example, telepresence includes a remote video camera in which the user can control the pan, tilt, and zoom, if the display is of sufficient size and quality to allow the user to feel present at the remote location.

None of these technologies alone provide a collaborative immersive environment for evaluating a design through interaction, virtual training on a task, and validating a simulation with a life video.

SUMMARY OF INVENTION

In view of the foregoing, embodiments of the present invention, for example, provide a collaborative visualization system, which integrates motion capture and virtual reality, along with kinematics and computer-aided design (CAD), for the purpose of, amongst others, evaluating a design. Embodiments of the present invention also provide, e.g., portable motion capture systems, which allow one or more persons to interact with real and artificial environments, and head mounted displays for evaluating a design, virtual training on a task, and validating a simulation with a real-world video, amongst others. Embodiments of the present invention further provide, for example, objects to be tracked by a motion capture system and incorporated into a virtual reality simulation. Embodiments of the collaborative visualization system can include, for example, an immersive environment with one or more simultaneous users, with one or more external observers, with real-time interactions and scaling, and with the ability to switch between a simulation and a telepresence view. An immersive environment can, for example, generate a three-dimensional or stereoscopic image which appears to surround the viewer. That is, the viewer is "immersed" in the artificial environment.

Embodiments of the present invention include, for example, a virtual reality simulator. The virtual reality simulator can receive data from CAD designs and display a simulation constructed from the data to a user via, for example, a head mounted display, resulting in full-scale and stereoscopic images. The images can be, for example, so detailed that the user can read the wording on the working knobs and switches within the simulation.

Embodiments of the present invention further include, for example, a motion capture system incorporated into the virtual reality simulator. The motion capture system, for example, can track the movements and interactions of a user (who is wearing a motion capture ensemble with flexible and adjustable level of detail, from just the head to a full body suit and gloves) within the virtual reality simulation so that the when the user's head rotates or tilts, the view of the simulation rendered in the head mounted display changes accordingly. The motion capture system, for example, can store the tracked movements and interactions of a user for later use, including, for example, training or design evaluation purposes. The motion capture system also can track the movements and interactions of multiple users within the virtual reality simulation such that the multiple users are represented by avatars in real time within the simulation. Thus, multiple users can simulate a coordinated activity within the simulation, such as performing routine maintenance on an aircraft, for example. In addition, the motion capture system, for example, can track the movements and interactions of objects, including tools and props used by a user.

Embodiments of the present invention also include, for example, an immersive observation system where multiple observers can view, in real-time, the virtual reality simulation including the interactions of the avatars in a common, immersive environment so as to evaluate the CAD design. The immersive observation system can include a CAVE (Cave Automatic Virtual Environment), such as, a reconfigurable 8-foot-high by 10-foot-wide by 10-foot-long room with displays on three walls and the floor, where one or more observers view a common environment in an immersive and interactive way, including stereoscopic and full-scale images. Advantageously, using the CAVE, the designers of the CAD design can observe end-users interacting extensively with the proposed design in the simulator to analyze and evaluate the design without having to build expensive prototypes. For example, observers can view users within the simulation performing the routine maintenance operations on the aircraft. In addition, trainees can observe, for example, trainers performing various tasks by viewing avatars of the trainers responsive to recorded motion capture data.

According to the embodiments of the present invention, the virtual reality simulator can scale each avatar in real time. That is, a 5' 4" user within the simulation can be scaled in real-time to be a 6' 2" avatar within the simulation. The images rendered in the 5' 4" user's head mounted display will correspond to the perspective expected by someone 6' 2". An observer of the simulation will see a 6' 2" avatar. Scaling may be accomplished by applying a ratio to each aspect of the data in the translation from motion capture data to simulation data. Alternately, scaling may be accomplished in real time by positioning the avatar's head, hands, and feet in the correct location to allow kinematics software to solve for the other joints. In addition, scaling may be accomplished in post processing, as opposed to in real time.

According to embodiments of the present invention, the virtual reality simulator can include interactions with the simulated environment. In one such example, the virtual reality simulator can include collision detection software to provide feedback within the simulation. If a user sticks his or her hand where the simulation indicates that a wall should be, for example a virtual collision is detected. The hand motion is set to either stop on the collision or allowed to disappear from the view of the user (because it is, after all, behind the wall), and the panel of the wall can be set to change color (or some other behavior) to provide feedback and indicate that a collision has occurred. In a preferred configuration, the wall turns red; similarly, if a knee "collides" with a toolbox in the simulation, the toolbox turns red. In exemplary configuration, the collision triggers a sound; the sound can be a directional sound indicating a direction of the collision with respect to the user or observer. Various types of sounds can further provide information regarding the collision, such as, severity or the objects involved in the collision. For example, a user hitting the user's head on part of an aircraft can result in a different sound than a object colliding with the floor. In addition, the simulation can alter its behavior based on detected collisions, by opening a door or panel, for example.

In addition, embodiments of the present invention can include a portable motion capture system for capturing tasks in the field. This system includes motion tracking markers (perhaps on a suit, body, or other apparel), a plurality of cameras installed on a tripod or clamped on a rigid structure so that cameras can track the movements of a user wearing the motion capture markers, and a computer to record the images from the camera. The portable motion capture system allows for a remote procedure, such as a field maintenance operation, be recorded. Because of the incorporated nature of the virtual reality simulator and the motion capture system provided by the embodiments of the present invention, the data from a field maintenance operation can later be studied in the virtual reality simulator for interactions with a new design or for real-time evaluation of, for example, an existing design or a sequence of operations on an existing design. Moreover, according to embodiments of the present invention, a portable motion capture system can be utilized for real-time design evaluation in the field, for presentation of a design, and for training at a remote location. Evaluation of a design can include, for example, evaluating a design with respect to an environment, an analysis of the ergonomics of the design, a study of tasks associated with the design, and other considerations as understood by those skilled in the art.

Furthermore, embodiments of the present invention include methods of validating a simulation with real-world video using immersive technology. For example, according to an embodiment of such a method, a spherical camera captures real-world video, or a real-world still photograph, at a remote location. Later, the video or photograph is rendered in a head mounted display. A motion capture system collects the user's head rotation information, which is used to control the pan, tilt, and zoom of the video. Then the user can switch between displaying the real-world video and the simulation as a way of validating the simulation. In addition, the video can be displayed on a desktop or CAVE. As an example, using a spherical camera to capture the real-world images from the deck of an aircraft carrier can be used to validate a simulation of that environment.

Embodiments of the present invention include, for example, systems and associated methods of providing an immersive environment with multiple simultaneous users, with external observers, with real-time interactions and scaling, and with the ability to switch between a simulation and a telepresence view, as will be understood by those skilled in the art. Embodiments of the present invention provide improved approaches to evaluate designs without having to build prototypes and to train personnel without the need for prototypes or on location travel.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

DETAILED DESCRIPTION OF INVENTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1:
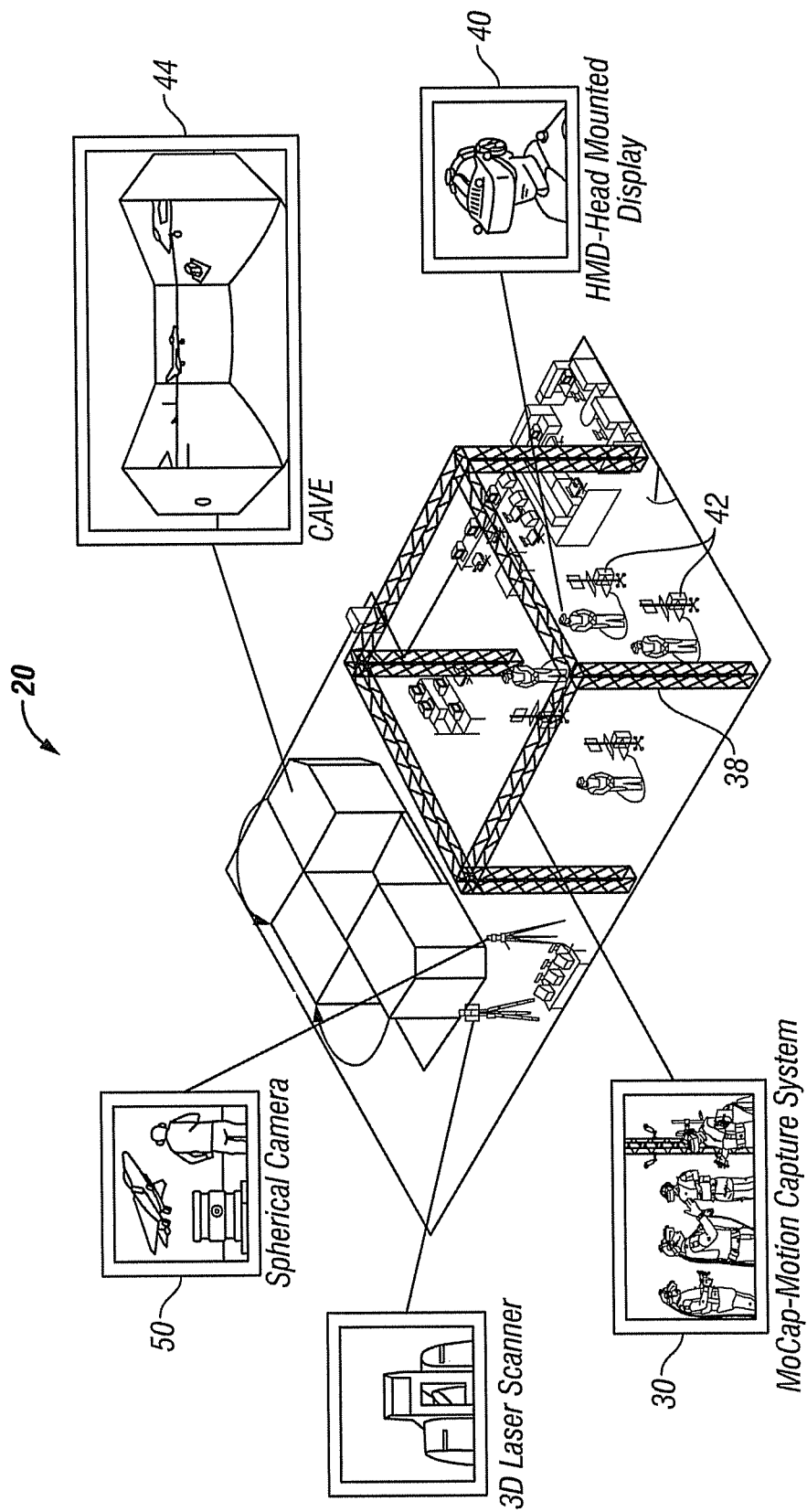
FIG. 1 is a schematic diagram of a system to provide a collaborative immersive environment for the evaluation of an engineering design according to an embodiment of the present invention.
Figure 10:
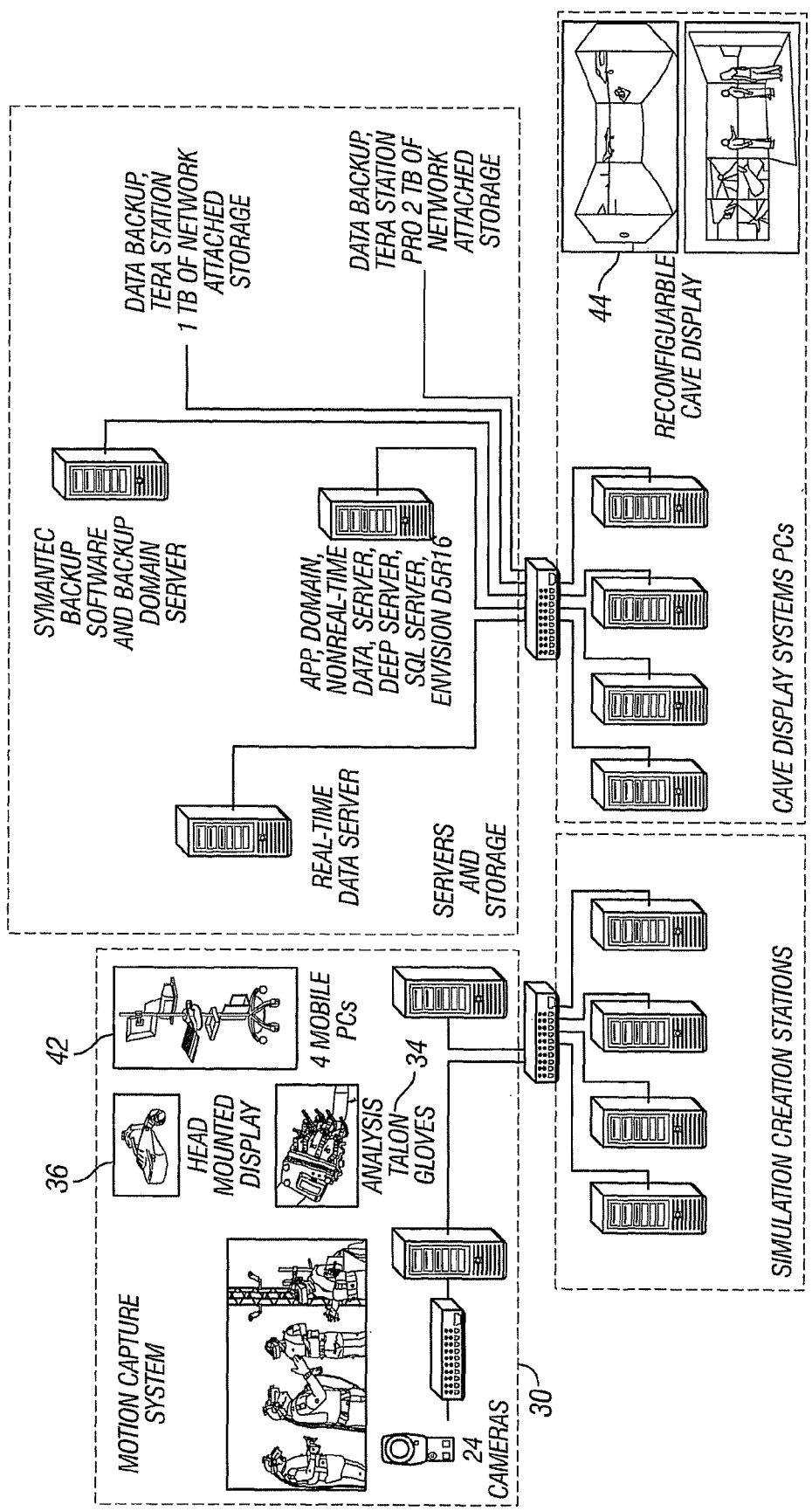
FIG. 10 is a schematic block diagram of a collaborative visualization system according to an embodiment of the present invention.

As illustrated in FIGS. 1 and 10, embodiments of the present invention include an collaborative visualization system 20 which integrates motion capture and virtual reality technologies, along with kinematics and CAD, for the purpose of, amongst others, evaluating a design, virtual training on a task, and validating a simulation with a real-world video. In addition, embodiments of the present invention include, for example, immersive observation environments as well.

Embodiments of the present invention include, for example, a virtual reality simulator 58 to create the virtual reality environment. The virtual reality simulator can receive data from a CAD program and create a virtual reality simulation of the design projected to a user via a head mounted display 40, as illustrated, for example, in FIGS. 1, 2, and 5. In addition, the simulation may be displayed via a desktop or a CAVE 44. The virtual reality simulation is three-dimensional (3D) and allows a user to inspect, evaluate, and interact with the CAD design. The simulation environment is labeled immersive because the simulation is 3D and full-scale, and the user's view can rotate throughout the simulation so that and the user becomes immersed in the simulation.

Embodiments provide for evaluation of designs for aircraft, space systems, spacecraft, ships, and missile systems, which often utilize an extensive evaluation process traditionally requiring, for example, expensive mock-ups and prototypes. The extensive evaluation process can advantageously include ergonomic analysis and task analysis for operation and maintenance tasks, as understood by those skilled in the art.

According to an exemplary embodiment of the present invention, the virtual reality software used includes ENVISION (D5) from DELMIA. As understood by those skilled in the art, this software provides a physics-based, 3D environment specifically for designing, verifying, and rapid prototyping of concept designs involving structures, mechanical systems, and humans. As understood by those skilled in the art, the software enhances system and subsystem level models with physics-based motion, virtual reality immersion, and ergonomic evaluation capabilities for highly accurate 3D simulation, analysis, and visualization. In addition, according to an exemplary embodiment of the present invention, other software components used to create the virtual reality environment include: PolyWorks from InnovMetric Software Inc, a software tool used to convert point cloud data to polygons; NuGraf from Okino Computer Graphics, a polygon conversion and reduction tool; Deep Exploration or Deep Server from Right Hemisphere, a polygon conversion and reduction tool; and MS Visual Studio from Microsoft, a code development suite. According to an exemplary embodiment of the present invention, the hardware supporting this software can includes: four Dell Precision Workstations 670, 16×DVD-ROM, 48/32 CDRW, Dual 3.0 Ghz Xeon with 2 MB L2 Cache, 800 FSB 4 GB RAM, nVidia Quadro FX3400 256 MB, 136 GB HD. As understood by those skilled in the art, the virtual reality simulator can include a computer program product, stored in one or more tangible computer readable media and readable by a computer so that the computer program product operates to perform the various instructions when read by the computer as described herein.

Figure 2:
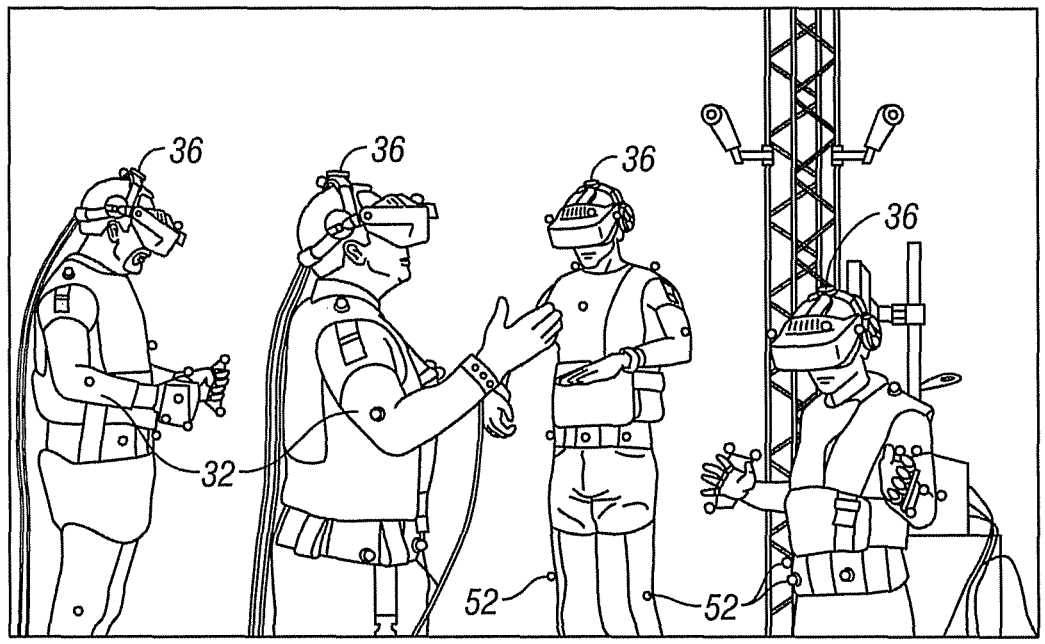
FIG. 2 is an environmental view illustrating four users wearing motion capture equipment interacting with a virtual reality simulation, according to another embodiment of the present invention.
Figure 3:
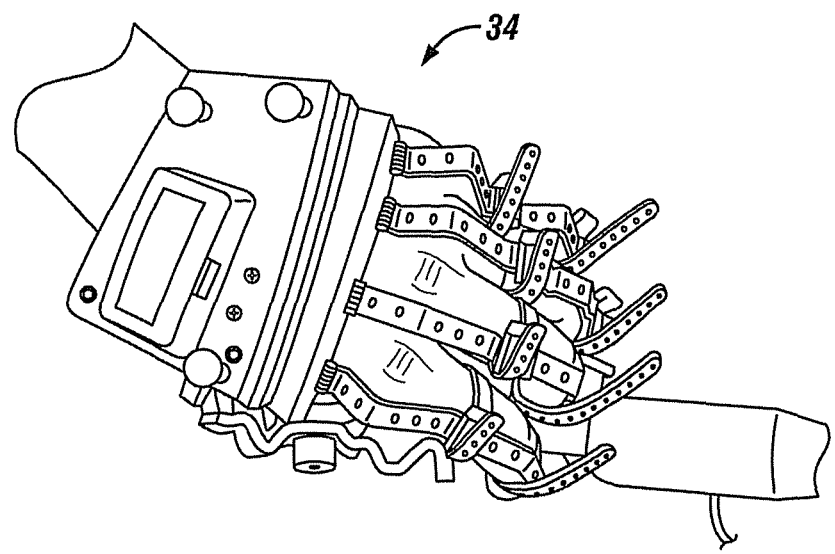
FIG. 3 is an environmental view of a motion capture glove according to an embodiment of the present invention.
Figure 8A:
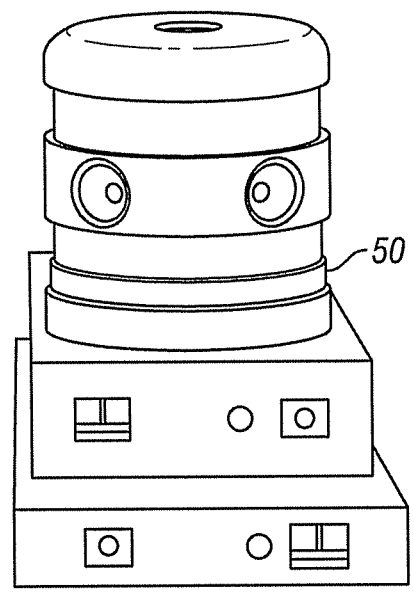
FIG. 8A is a perspective view of a spherical camera according to an embodiment of the present invention.
Figure 8B:
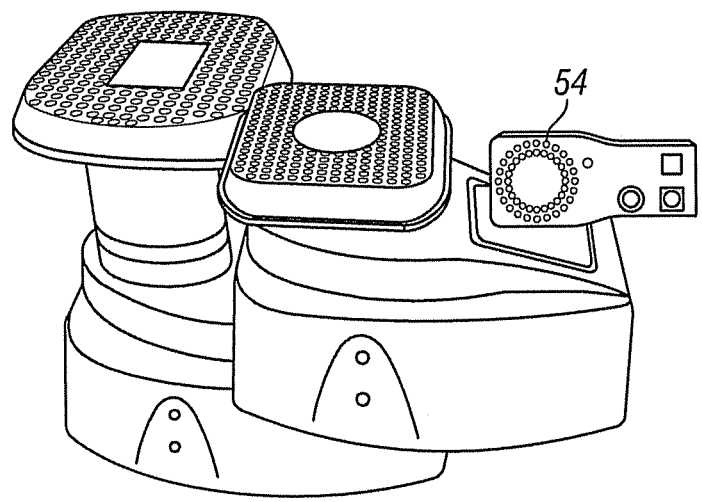
FIG. 8B is a perspective view of motion capture cameras according to an embodiment of the present invention.

As illustrated in FIGS. 1, 2, and 3, according to an embodiment of the present invention, the motion capture system 30 includes, for example, users wearing bodysuits 32, gloves 34, and headgear 36 with markers 52 at known locations on the suit, such as the knee, the wrist, and the top of the shoulders. The motion capture system can further include real objects, or props, also having markers to be represented in the virtual reality simulator. Cameras 54, as illustrated in FIG. 8B, then digitally record the locations of the markers as the users move around and interact in the simulation, capturing a set of data. This motion capture data can then made available, in real time, to the virtual reality simulator 58 so that the users and their movements are modeled as avatars 56 within the simulation and so that feedback is provided to the users. An avatar is an electronic image that represents and is manipulated by, or driven by a computer user, as in a computer game or other virtual reality setting, typically being an incarnation in human form.

According to an exemplary embodiment of the present invention, the motion capture system 30 includes up to twenty-four cameras 54 (e.g., 12 Eagle-i and 12 Hawk-i from Motion Analysis Corporation, as shown in FIG. 8B), for example, mounted on a truss 38 (e.g., L×W×H is 20'×15'×10') used to track up to six concurrent users wearing head-mounted displays 40, gloves 34 (e.g., TALON Gloves from Motion Analysis Corporation), and body suits 32. According to an embodiment of the present invention, the motion capture system 30 uses software from Motion Analysis Corporation called EVaRT V5.0.4 and includes the following plug-ins: Animation Plugins, RT2 Animation Plugins, Calcium 4, Talon Streaming 4, Talon Viewer 4, and EVaRT5. As understood by those skilled in the art, this software allows templates and props to be created and customized for tracking everything from physical mockups to full body person. In addition, VRSim's SimIO module can be used to multicast the data collected by EVaRT to be used by the simulation engine software ENVISION D5. As understood by those skilled in the art, embodiments can, for example, incorporate any number of cameras.

Figure 9:
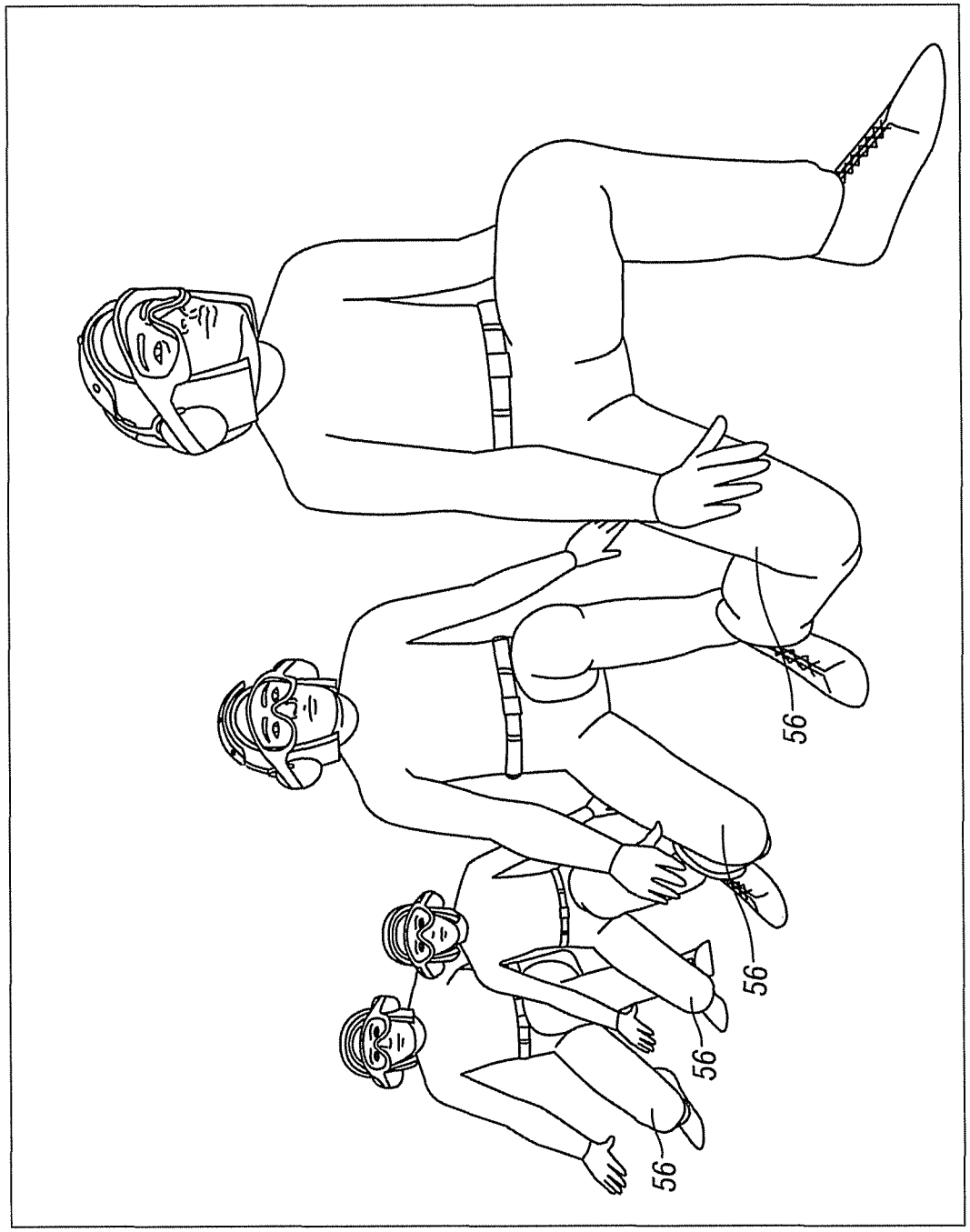
FIG. 9 is an perspective view of avatars within a virtual reality simulation according to an embodiment of the present invention.

According to an embodiment of the present invention, the virtual reality simulator can, for example, scale each avatar in real time. That is, a 5' 4" user within the simulation can be scaled in real-time to be a 6' 2" avatar within the simulation. The images rendered in the 5' 4" user's head mounted display will correspond to the perspective expected by someone 6' 2". An observer of the simulation will see a 6' 2" avatar, and the avatar's posture will match that of the user. Scaling may be accomplished by applying a ratio to each aspect of the data in the translation from motion capture data to simulation data. Alternately, scaling may be accomplished by positioning the avatar's head, hands, and feet in the correct location to allow kinematics software to solve for the other joints. FIG. 9 illustrates 4 avatars scaled to different sizes, all driven from the same user; hence, all have the same posture. Note also that scaling can be accomplished in post processing, as opposed to in real time. That is, for a remote training example, a user, i.e., a trainee, of a first size, e.g., 6' 2", can be displayed an avatar of the first size, e.g., 6' 2", responsive to motion capture data from a user, i.e., a trainer, of a second size different than the first size, e.g., 5' 4".

Figure 5:
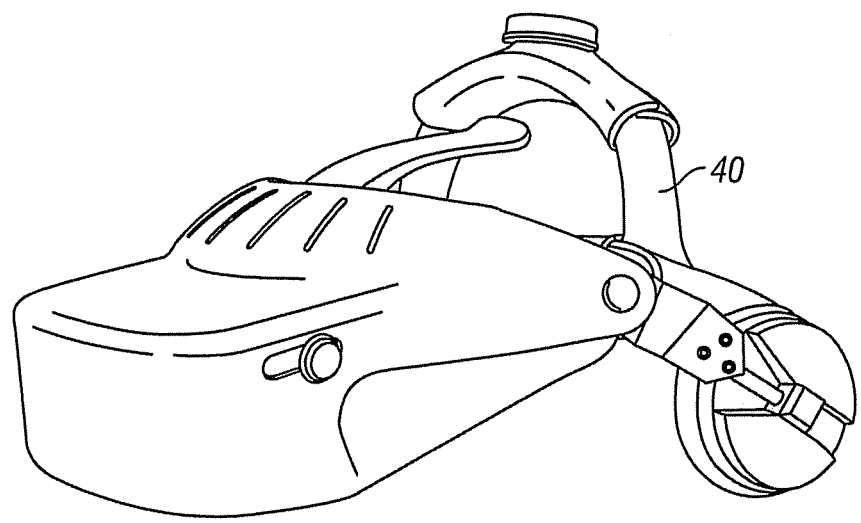
FIG. 5 is a perspective view of a head-mounted display according to an embodiment of the present invention.

As illustrated in FIGS. 1, 2, and 5, according to embodiments of the present invention, a user experiences the virtual reality environment visually through a head-mounted display 40, and each of the head mounted displays can have a different perspective of the virtual reality simulation. The head-mounted display 40 can include a stereo display helmet worn by users for immersive visualization of full-scale data. As understood by those skilled in the art, one type of head-mounted display 40, the VR1280 from Virtual Research, has the ability to display at 1280×1204 at 60 Hz in mono or stereo. As understood by those skilled in the art, a head mounted displays can include separate left-eye and right-eye displays with different images so that a user views an image in the head mounted display stereoscopically.

In an exemplary embodiment of the present invention, the software used to display the 3D scene can be based on OpenSceneGraph 3D graphics toolkit. MiniViz from VRSim is a viewer that allows the user to view a running ENVISION (D5) simulation. The viewer loads models in the environment and then references the ENVISION (D5) simulation for the positions of the models and tracked viewpoints.

Figure 4:
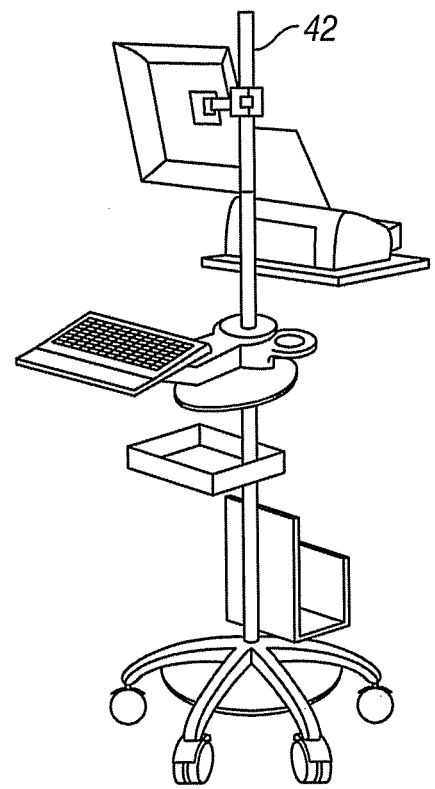
FIG. 4 is a perspective view of a Hergo Easy Mount Mobile Computer Cart—Star Base according to an embodiment of the present invention.

Embodiments of the present invention provide computer workstations to support the head-mounted displays. In an exemplary embodiment of the present invention, the hardware used to support four head-mounted displays includes: four Dell Precision Workstation 670, 16×DVD-ROM 48/32 CDRW, Dual 3.0 Ghz Xeon with 2 MB L2 Cache, 800 FSB, 4 GB RAM, nVidia Quadro FX3400 256 MB, 136 GB HD. For convenience and as understood by those skilled in the art, a Hergo Easy Mount Mobile Computer Cart—Star Base 42, as illustrated in FIG. 4, can be used to mount each set of equipment, including the computer, keyboard, mouse, head-mounted display 40, Talon Gloves 34, and a flat panel monitor from Hergo, according an embodiment of the present invention.

According to embodiments of the present invention, the virtual reality simulator can include, for example, interactions with the simulated environment. In one such example, the virtual reality simulator can include collision detection software to provide feedback within the simulation. If a user sticks a hand where the simulation indicates that a wall should be, a virtual collision is detected. The hand can be stopped at the time of the collision or be allowed to disappear from the view of the user and the panel of the wall change color (or some other behavior) to provide feedback and indicate that a collision has occurred. In a preferred configuration, the wall turns red. Similarly, if a knee "collides" with a bomb in the simulation, the bomb turns red. In an exemplary embodiment, an appearance of the object is altered in response to the collision. In exemplary configuration, the collision triggers a sound; the sound can be a directional sound indicating a direction of the collision with respect to the user or observer. Various types of sounds can further provide information regarding the collision, such as, severity or the objects involved in the collision. For example, a user hitting the user's head on part of an aircraft can result in a different sound than a object colliding with the floor. In addition, the simulation can alter its behavior based on detected collisions, by opening a door or panel, for example. In addition, this collision detection feature can be used to facilitate the grabbing of a virtual object within the simulation, permitting the object to be moved or otherwise manipulated in the virtual environment. Collisions can also occur between avatars and between simulated objects, such as, between a simulated hand tool and simulated wall.

Embodiments of the present invention can also include, for example, an immersive observation environment as well. The observation environment allows designers to observe and interact with the virtual reality simulation including the avatars 56 (see FIG. 9), which can be driven in real-time by motion capture data from the users. As illustrated in FIG. 1, the observation environments can include the CAVE (Cave Automatic Virtual Environment) 44, a reconfigurable, e.g., 8-foot-high by 10-foot-wide by 10-foot-long room with displays on three walls and the floor, where one or more observers view a common environment in an immersive way, including stereoscopic and full-scale images. As understood by those skilled in the art, the CAVE 44 from Mechdyne displays a resolution of 1280×1024 at 96 Hz. Therefore, designers and other observers can view in real-time detailed interaction of the users within the simulation. In an exemplary configuration, one wall of the CAVE 44 may be used to display all individual viewpoints with the other two walls and the floor of the CAVE 44 being used to display an overall view. In this configuration, an observer immersed in the simulation can view avatar 56 posture and the avatar view point simultaneously. Other available data, such as temperature, distance measurements, time, etc. whether visible or not, may be also be displayed on the one wall of the CAVE 44, according to an exemplary configuration.

In an exemplary embodiment of the present invention, the software used to display the 3D scene is based on OpenSceneGraph, a 3D graphics open source toolkit. Much like the stand alone viewer for the head-mounted display, the CAVE 44 can use the MiniViz software program. The projections of each screen, however, can be mapped using an Application Programmer's Interface (API) called CAVELib from Mechdyne. Also running the CAVE 44 are other programs, which can include: Vega, Vega Prime, and Ensight Gold, according to an embodiment of the present invention.

Figure 6:
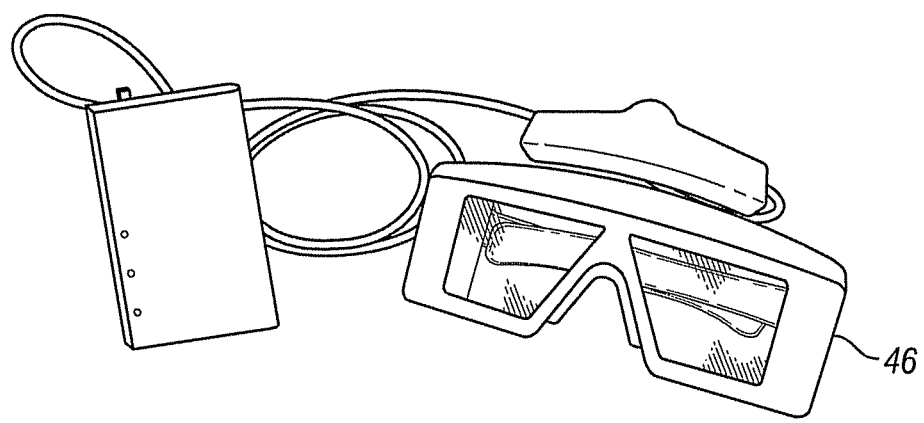
FIG. 6 is a perspective view of a head tracker to be used in conjunction with the CAVE according to an embodiment of the present invention.
Figure 7:
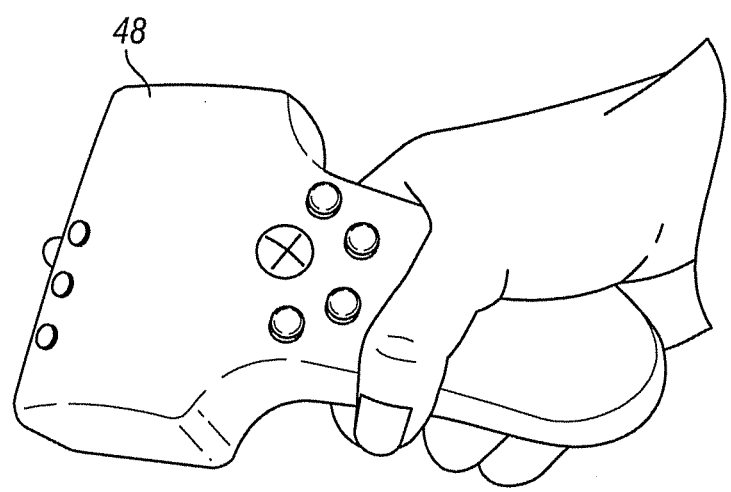
FIG. 7 is an environmental view of wand hardware to be used in conjunction with the CAVE according to an embodiment of the present invention.

Embodiments of the present invention can also include head tracker 46 (see FIG. 6) and wand hardware 48 (see FIG. 7), to be used in the CAVE 44 to allow the observers to move around easily within the simulation. According to an exemplary embodiment of the present invention, the InterSense IS-900 uses a combination of inertial and ultrasonic sensors to determine the positions of the head tracker and wand. The software running the head tracker and wand can include a program called Trackd 5.5 from VRCO. As understood by those skilled in the art, the Trackd application takes information from the head tracker and wand and makes that information available to either CAVELib or the ENVISION (D5) simulation. This tracked information is applied to correct the projections on the walls and the floor of the CAVE 44.

Embodiments of the present invention can also include, for example, an immersive environment with the ability to switch between a simulation and a telepresence view. The telepresence view is available through the CAVE 44, a head mounted device 40, or desktop display. The content for the telepresence view are gathered via a spherical camera 50 (see FIG. 8A) at a remote location, such as, for example, the surface of an aircraft carrier. According to an embodiment of the present invention, the spherical camera 50 has a set of six digital cameras embedded into one device that captures 75% of a sphere. The dynamic scene can be displayed in the head mounted display 40 or the CAVE 44, where the user can be immersed in real-world video information to help validate simulations. As understood by those skilled in the art, the Ladybug2 is a 4.7 MegaPixel video capture device using six 1024×768 CCDs. According to an exemplary embodiment of the present invention, the Ladybug2 from Point Grey Research comes with a software development environment Laybug2 SDK and a tool called LadybugCap that allows content to be captured; this software produces spherical avi files for playback, as understood by those skilled in the art. In an exemplary embodiment, Ladybug3 can be used for better resolution but a lower frame rate.

As understood by those skilled in the art, the spherical camera 50 produces data files in 1 GB increments, which may be 2 seconds or 2 minutes. So, 30 seconds of video capture can turn into 15 files at 1 GB each. These files require translation into a viewable format. Other solutions use a video editor and paste the first viewable files together to form a single video file, in the process reducing the quality to produce a smaller, second level video file. In contrast, embodiments of the present invention read the first level video files into buffers and provide indexing, such as the first file, last, current, the file before the current and the file after the current. This allows the video group with many files to be played as if they were a single video file.

According to an embodiment of the present invention, real-world objects can be scanned to create models for the virtual reality simulator. In an exemplary embodiment of the present invention, the Creatform Handy Scan EXAscan can be employed. In an exemplary embodiment of the present invention, a Leica HDS 3000 can be employed. The Leica HDS 3000 is a laser based device that scans equipment to quickly create high-fidelity 3D models where they do not yet exist. As understood by those skilled in the art, in practice, the true resolution of the scanner is ¼" of point accuracy for unmodeled data and ⅛" of point accuracy for data modeled based on multiple points from a point cloud. According to an exemplary embodiment of the present invention, the software used to capture the area, set the resolution, and register the point clouds together is Cyclone. Also used is PolyWorks to register the clouds and produce polygon geometry to be incorporated into the simulation. According to an exemplary embodiment of the present invention, the hardware supporting the device can be a Dell Precision M70 Laptop, 1.86 GHz, 1 GB RAM, and Nvidia Quadro FX Go 1400.

Embodiments of the present invention can include, for example, a portable motion capture system for capturing tasks in the field. According to an embodiment of the portable motion capture system, the system can include markers at predetermined locations, a motion capture suit, a plurality of cameras installed on a tripod so that cameras can track the movements of a user wearing the motion capture suit, and a computer or other storage medium to record the images from the camera. According to another embodiment of the portable motion capture system for capturing tasks in the field, the system can include markers at predetermined locations, a motion capture suit, a plurality of cameras clamped on a rigid structure so that cameras can track the movements of a user wearing the motion capture suit, and a computer or other storage medium to record the images from the camera and to digitally record locations of the markers associated with the bodysuit, responsive to the recorded images from the plurality of cameras. In a training application, for example, motions of a remote trainer at a first location can be tracked and captured for training of a trainee at a second location, ever later or in real time. In addition, motions of one or more users can be tracked and captured for task analysis, including, for example, ergonomic and efficiency analysis. In another embodiment, for example, a portable motion capture system can be utilized for real-time design evaluation in the field and for design presentation or demonstration, including, for example, a new design.

Figure 11:
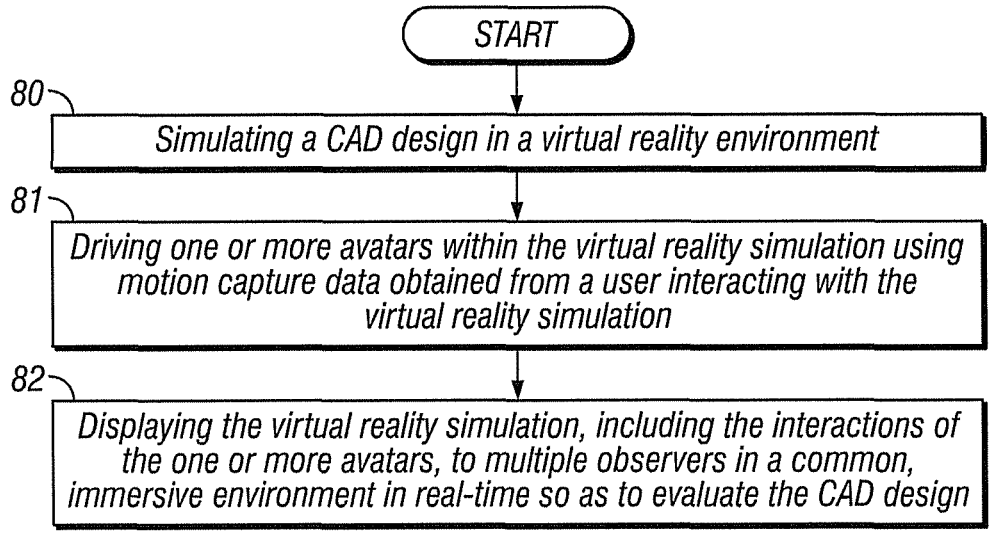
FIG. 11 is a schematic flow diagram of a method to provide a collaborative immersive environment for the evaluation of an engineering design according to an embodiment of the present invention.

The embodiments of the present invention include a method of evaluating an engineering design, as illustrated in FIG. 11. The method includes simulating a CAD design in a virtual reality environment (step 80) and driving one or more avatars within the virtual reality simulation using motion capture data obtained from a user interacting with the virtual reality simulation (step 81). The method continues with displaying the virtual reality simulation, including the interactions of the one or more avatars, to multiple observers in a common, immersive environment in real-time so as to evaluate the CAD design (step 82) to thereby verify that tasks associated with a product built according to the CAD design can be performed by a predetermined range of user sizes.

Figure 12:
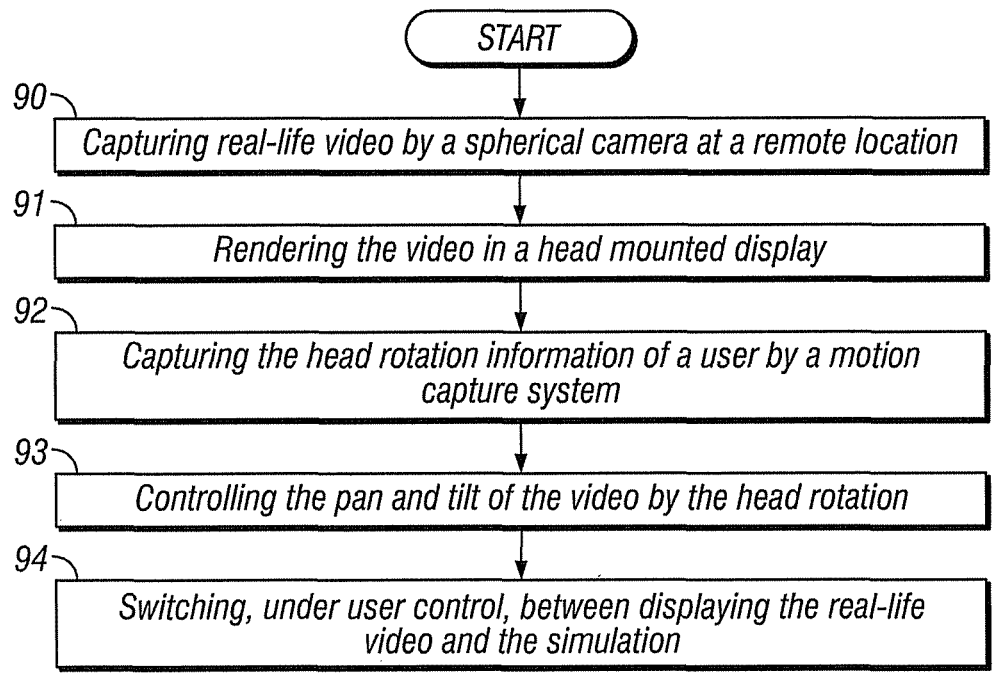
FIG. 12 is a schematic flow diagram of a method of validating a simulation with real-world video using immersive technology according to an embodiment of the present invention.

The embodiments of the present invention include a method of validating a simulation with real-world video using immersive technology, as illustrated in FIG. 12. The method includes capturing real-world video by a spherical camera at a remote location (step 90) and rendering the video in a head mounted display (step 91). The method continues with capturing the head rotation information of a user by a motion capture system (step 92) and controlling the pan, tilt, and zoom of the video by the head rotation information of the user (step 93). The method also includes switching, under user control, between displaying the real-world video and the simulation (step 94).

The embodiments of the present invention also include a computer program product, stored on a tangible computer memory media, operable on a computer, the computer program product comprising a set of instructions that, when executed by the computer, cause the computer to perform various operations. The operations include, for example, receiving CAD data, generating video signals to simulate in virtual reality the design from the CAD data, providing for the tracking of multiple users interacting with each other and the simulation, providing for the tracking of objects interacting with the simulation, generating scaled avatars within the simulation, generating video signals for the common immersive environment, and receiving user input to select between video, graphics, or both together.

Embodiments can also include a computer program product, being stored in one or more tangible computer readable media and readable by a computer so that the computer program product operates to perform instructions described herein when read by the computer. The instructions include recording at a first location full-body motion capture data for one or more trainers performing one or more tasks by a portable motion capture system. The instructions include animating one or more avatars within a virtual reality simulation by a virtual reality simulator at a second location, responsive to recorded motion capture data for the one or more trainers at the first location so that each of the one or more trainers corresponds to one of the one or more avatars. The instructions include displaying the virtual reality simulation, including the one or more animated avatars, as a three-dimensional image that appears to surround one or more trainees to thereby define a common immersive environment using one or more head mounted displays so that the one or more trainees can analyze the one or more tasks performed. The instructions can also include obtaining motion capture data for one or more trainees interacting with the virtual reality simulation through a motion capture system; animating one or more avatars within a virtual reality simulation by a virtual reality simulator in real time, responsive to motion capture data for the one or more trainees at the second location; detecting a collision between an avatar animated by a trainee and a simulated object in the virtual reality simulation by the virtual reality simulator; and altering a color of the simulated object in the virtual reality simulation by the virtual reality simulator to provide feedback for the detected collision.

The embodiments of the present invention can also include a system for training at a remote location, for example, tasks associated with operation or maintenance of an aircraft. Likewise, tasks can be associated with the operation or maintenance of a design for an aircraft, a space system, a spacecraft, a ship, or a missile system.

Embodiments of the present invention further include a method of simulating a task. The method includes recording full-body motion capture data for one or more users performing one or more tasks by a portable motion capture system. The method includes animating one or more avatars within a virtual reality simulation by a virtual reality simulator responsive to motion capture data for the one or more users so that each of the one or more users corresponds to one of the one or more avatars. The method includes displaying the virtual reality simulation, including the one or more animated avatars, as a three-dimensional image using one or more head mounted displays so that each of the one or more head mounted displays can provide a different perspective of the virtual reality simulation.

The system includes a portable motion capture system 30, 42 at a first location positioned to track the movements of one or more users, e.g., trainers, and to record full-body motion capture data for one or more users, e.g., trainers, performing one or more tasks. The system can include a virtual reality simulator 58 being positioned to receive the recorded motion capture data from a first location and capable of animating one or more avatars 56 within a three-dimensional virtual reality simulation at a second different location, responsive to recorded motion capture data. The system can include an immersive observation system to display the virtual reality simulation, including the one or more animated avatars 56, as a three-dimensional image that appears to surround one or more trainees to thereby define a common immersive environment 20 using one or more head mounted displays 40 so that each of the one or more head mounted displays 40 can have a different perspective of the virtual reality simulation and so that the one or more trainees can analyze the one or more tasks performed.

It is important to note that while embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the design and evaluation program product and the method steps, described above.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the attached claims.

That claimed is:

1. A system for evaluating an engineering design, the system comprising:
    a virtual reality simulator being positioned to receive computer-aided design (CAD) data comprising a CAD design and to create a full-scale, three-dimensional virtual reality simulation from the CAD design data, the three-dimensional virtual reality simulation being displayed on one or more stereoscopic head mounted displays, each of the one or more head mounted displays having a different perspective of the virtual reality simulation;
    a motion capture system being incorporated into the virtual reality simulator and being positioned to track the movements of one or more users within the virtual reality simulation simultaneously, the motion capture system comprising:
        one or more motion capture bodysuits, gloves, and headgear having markers at predetermined locations,
        a plurality of cameras in preselected locations positioned to record images that capture movements of the one or more users wearing a motion capture bodysuit, gloves, and headgear, and
        one or more computers to digitally record locations of the markers associated with the bodysuit, gloves, and headgear as the one or more users interact in the simulation, responsive to the recorded images from the plurality of cameras; and
    an immersive observation system where the one or more users view the virtual reality simulation stereoscopically and in real time to thereby define a common immersive environment so that the one or more users can evaluate the CAD design;
    whereby the tracked movements of the one or more users drive one or more avatars within the virtual reality simulation and movements of the one or more avatars correspond to the tracked movements of the one or more users; wherein the virtual reality simulator is further positioned to detect a collision between an avatar and the three-dimensional virtual reality simulation from the CAD design and to cause a portion of the avatar to disappear from a view of a user of the one or more users to provide feedback for the detected collision.

2. A system of claim 1, wherein the virtual reality simulator is further positioned scale each of the one or more avatars independently in real time, each of the one or more avatars being scaled to a size within a predetermined range of user sizes, to thereby verify that tasks associated with a product built according to the CAD design can be performed by a predetermined range of user sizes.

3. A system of claim 2, wherein the motion capture system supports at least 6 users, and wherein the virtual reality simulator animates at least 6 avatars.

4. A system of claim 1, wherein the immersive observation system includes a configurable display unit comprising three walls and a floor, wherein the display unit provides stereoscopic and full-scale images to the one or more users, defining a Cave Automatic Virtual Environment (CAVE).

5. A computer program product, stored in one or more tangible computer readable media and readable by a computer so that the computer program product operates to perform the following instructions when read by the computer:
    receiving computer-aided design (CAD) data by a virtual reality simulator;
    generating video signals by the virtual reality simulator to simulate in virtual reality a design from the CAD data, the video signals directed toward one or more head mounted displays, each of the one or more head mounted displays having a different perspective of the virtual reality simulation, each of the one or more head mounted displays including separate left-eye and right-eye displays having different signals so that a user views an image in the head mounted display stereoscopically;

tracking movements of one or more users interacting with the virtual reality simulation;

generating motion capture data for the one or more users responsive to the tracked movements of the one or more users through a motion capture system, the motion capture system comprising:

one or more motion capture bodysuits, gloves, and headgear having markers at predetermined locations;

a plurality of cameras in preselected locations positioned to record images that capture movements of one or more users wearing a motion capture bodysuit, gloves, and headgear; and one or more computers to digitally record locations of the markers associated with the bodysuit, gloves, and headgear as the one or more users interact in the simulation, responsive to the recorded images from the plurality of cameras;

driving in real time one or more scaled avatars within the simulation by the virtual reality simulator utilizing the motion capture data for the one or more users, wherein movements of the one or more avatars correspond to the tracked movements of the one or more users so that a user of a first size simulates an avatar of a second size, the second size different than the first size, and so that the one or more users can evaluate the CAD design;

detecting a collision between an avatar of the one or more scaled avatars and the three-dimensional virtual reality simulation from the CAD design; and causing a portion of the avatar to disappear from a view of a user of the one or more users to provide feedback for the detected collision.

6. A computer program product of claim 5, wherein the program product further operates to perform the following instructions:

tracking movements of one or more real objects used by the one or more users;

generating motion capture data for one or more real objects responsive to the tracked movements of the one or more real objects; and representing the one or more real objects within the simulation by the virtual reality simulator responsive to the motion capture data.

7. A computer program product of claim 5, wherein the program product further operates to perform the following instructions:

displaying the virtual reality simulation on a configurable display unit comprising three walls and a floor, wherein the display unit provides stereoscopic and full-scale images to one or more observers, defining a Cave Automatic Virtual Environment (CAVE).

8. A method of evaluating an engineering design, the method comprising:

creating a three-dimensional virtual reality simulation by a virtual reality simulator responsive to computer-aided design (CAD) data from a CAD design;

animating in real time one or more avatars within the virtual reality simulation by the virtual reality simulator, responsive to motion capture data obtained through a motion capture system from one or more users simultaneously interacting with the virtual reality simulation so that each of the one or more users corresponds to one of the one or more avatars, whereby movements of the one or more users drive the one or more avatars, movements of the one or more avatars corresponding to the movements of the one or more users, the motion capture system comprising:

one or more motion capture bodysuits, gloves, and headgear having markers at predetermined locations, a plurality of cameras in preselected locations positioned to record images that capture movements of one or more users wearing a motion capture bodysuit, gloves, and headgear, and one or more computers to digitally record locations of the markers associated with the bodysuit, gloves, and headgear as the one or more users interact in the simulation, responsive to the recorded images from the plurality of cameras;

displaying the virtual reality simulation, including the interactions of the one or more avatars, as a three-dimensional image that appears to surround one or more users in real time to thereby define a common immersive environment using one or more head mounted displays so that the one or more users has a different perspective of the virtual reality simulation responsive to the motion capture data;

detecting a collision between an avatar of the one or more scaled avatars and the three-dimensional virtual reality simulation from the CAD design; and causing a portion of the avatar to disappear from a view of a user of the one or more users to provide feedback for the detected collision.

9. A method of claim 8, further comprising:

scaling each of the one or more avatars independently in real time by the virtual reality simulator, each of the one or more avatars being scaled to a size within a predetermined range of user sizes, so that a user of a first size simulates an avatar of a second size different than the first size to thereby verify that tasks associated with a product built according to the CAD design can be performed by a predetermined range of user sizes.

10. A method of claim 8, further comprising:

displaying the virtual reality simulation on a configurable display unit comprising three walls and a floor, wherein the display unit provides stereoscopic and full-scale images to one or more observers, defining a Cave Automatic Virtual Environment (CAVE).

11. A system of claim 1, wherein the virtual reality simulator is further positioned to provide a positional sound, the positional sound indicating a position of the collision with respect to the user, to provide feedback for the detected collision.

12. A system of claim 1, wherein the virtual reality simulator is further positioned to alter an appearance of a portion of the three-dimensional virtual reality simulation to provide feedback for the detected collision.

13. A system of claim 12, wherein the portion of the three-dimensional virtual reality simulation is a wall, and the virtual reality simulator being positioned to alter the appearance of the wall is positioned to change a color of the wall.

14. A system of claim 1, wherein the collision is a first collision, and wherein the virtual reality simulator is further positioned to detect a second collision between a simulated object and the three-dimensional virtual reality simulation from the CAD design and to alter an appearance of the simulated object to provide feedback for the detected second collision.

* * * * *